US011328057B2

(12) United States Patent
Helman et al.

(10) Patent No.: US 11,328,057 B2
(45) Date of Patent: May 10, 2022

(54) DETECTION OF MALICIOUS DATA IN A CONTAINERIZED ENVIRONMENT

(71) Applicant: VMware, Inc., Palo Alto, CA (US)

(72) Inventors: Haim Helman, Los Gatos, CA (US); Meori Oransky, Ramat Gan (IL); Julien Sobrier, Saratoga, CA (US)

(73) Assignee: VMware, Inc., Palo Alto, CA (US)

( * ) Notice: Subject to any disclaimer, the term of this patent is extended or adjusted under 35 U.S.C. 154(b) by 175 days.

(21) Appl. No.: 16/750,252

(22) Filed: Jan. 23, 2020

(65) Prior Publication Data

US 2021/0232678 A1 Jul. 29, 2021

(51) Int. Cl.
*G06F 21/55* (2013.01)

(52) U.S. Cl.
CPC ...... *G06F 21/552* (2013.01); *G06F 2221/034* (2013.01)

(58) Field of Classification Search
CPC ............ G06F 21/552; G06F 2221/034; G06F 21/554; G06F 21/53; H04L 63/1408
See application file for complete search history.

(56) References Cited

U.S. PATENT DOCUMENTS

| | | | |
|---|---|---|---|
| 10,326,744 B1 | 6/2019 | Nossik et al. | |
| 10,902,114 B1 * | 1/2021 | Trost | G06F 16/26 |
| 10,936,717 B1 * | 3/2021 | Herman Saffar | G06F 21/56 |
| 2015/0033340 A1 | 1/2015 | Giokas | |
| 2018/0260574 A1 * | 9/2018 | Morello | G06F 21/566 |
| 2018/0278639 A1 * | 9/2018 | Bernstein | G06F 21/577 |
| 2018/0336351 A1 * | 11/2018 | Jeffries | H04L 63/101 |
| 2019/0028490 A1 | 1/2019 | Chen et al. | |
| 2019/0058722 A1 * | 2/2019 | Levin | G06F 9/455 |

* cited by examiner

*Primary Examiner* — Christopher A Revak
(74) *Attorney, Agent, or Firm* — Fish & Richardson P.C.

(57) ABSTRACT

A system which includes at least one host, wherein the host is configured to implement at least one container group including a first container, a data communication module, an interface, and a malicious detection module, wherein the data communication module is configured to collect data based on data communication of the container group, and transmit collected data, or data representative thereof, to the interface, the interface being configured to transmit collected data, or data representative thereof, to the malicious detection module, for detecting malicious data.

20 Claims, 7 Drawing Sheets

_281
Description: Detected access to a webpage which can help the attacker to gain understanding of the system in use.
| 6e | 78f | 73 | 61 | 74 |
|----|-----|----|----|----|
| 75 | 20  | 22 |    |    |
| 11 | 11  | 21 | 32 | 65 |
| 23 | 31  | 75 | 20 | 22 |
| 32 | 53  | 32 | 30 | 34 |
| 0E | 25  | 33 | 52 | 74 |
| 83 | 65  | 53 | 03 | 53 |
280
Fig. 2B
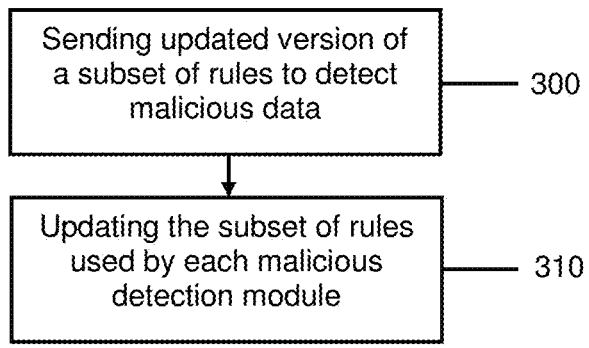
Fig. 3
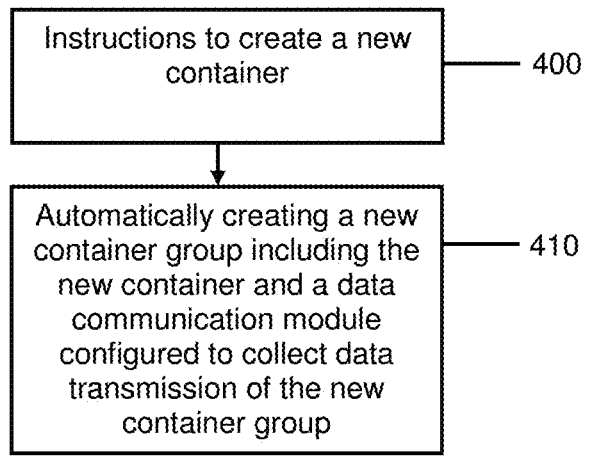
Fig. 4

DETECTION OF MALICIOUS DATA IN A CONTAINERIZED ENVIRONMENT

TECHNICAL FIELD

The presently disclosed subject matter relates to methods and systems for detecting malicious activity, in particular in a containerized environment.

BACKGROUND

Classical firewalls generally perform an analysis of data exchanged by a server, and based on a black list of malicious data, attempt to detect whether exchanged data is malicious.

This solution is not adapted to a containerized environment.

There is now a need to provide new methods and systems for detecting malicious activity, in particular in a containerized environment.

GENERAL DESCRIPTION

In accordance with certain aspects of the presently disclosed subject matter, there is provided a system including at least one host, wherein the host is configured to implement: at least one container group including a first container and a data communication module, an interface, a malicious detection module, wherein the data communication module is configured to collect data based on data communication of the container group and transmit collected data, or data representative thereof, to the interface, the interface being configured to transmit collected data, or data representative thereof, to the malicious detection module, for detecting malicious data.

In addition to the above features, the system according to this aspect of the presently disclosed subject matter can optionally comprise one or more of features (i) to (ix) below, in any technically possible combination or permutation:
  i. the host implements a plurality of container groups, wherein each container group includes a first container, a data communication module, wherein the data communication module of each container group is configured to: collect data based on data communication of the container group, transmit collected data to the interface, the interface being configured to transmit collected data, or data representative thereof, to the malicious detection module, for detecting malicious data;
  ii. the system includes at least one of (a), (b) and (c): (a) the host implements a single interface common for a plurality of container groups; (b) for each container group of plurality of container groups of the host, the data communication module is a single module; and (c) the host implements a single malicious detection module;
  iii. the system includes a plurality of hosts, wherein each host implements at least one container group including a first container and a data communication module, an interface, a malicious detection module, wherein the data communication module is configured to collect data based on data communication of the container group and transmit collected data to the interface of the host, the interface being configured to transmit collected data, or data representative thereof, to the malicious detection module of the host, for detecting malicious data;
  iv. the system is configured to, upon implementation of a new first container on a new host, implement, on the new host: a group of containers including the new first container and a data communication module, an interface, a malicious detection module, wherein the data communication module is configured to: collect data based on data communication of the container group, and transmit collected data to the interface of the host, the interface being configured to transmit collected data, or data representative thereof, to the malicious detection module of the host, for detecting malicious data;
  v. the malicious detection module of the host is configured to analyse collected data, or data representative thereof, according to a set of rules, wherein the set of rules is updatable based on instructions of an external server;
  vi. the malicious detection module of the host is configured to perform a first analysis of whether collected data, or data representative thereof, is malicious; if the first analysis indicates that collected data, or data representative thereof is malicious, at least part of the collected data, or data representative thereof is sent to a third party for a second analysis;
  vii. if malicious data has been detected based on least on an output of the malicious detection module, the system is configured to trigger performing an action for the malicious data;
  viii. the malicious detection module of the host is configured to provide, upon detection of malicious data, at least one of: one or more sequences of source code of data identified as malicious; data representative of time of malicious data; data representative of a source of malicious data; data representative of a container group for which malicious data has been detected; and data representative of a host for which malicious data has been detected; and
  ix. the data communication module is implemented in a second container within the container group, distinct from the first container, or the data communication module is implemented within the first container.

According to another aspect of the presently disclosed subject matter there is provided a method including, by at least one processing unit and memory: collecting data based on data communication of a container group including at least one container, the container group being implemented on a host, wherein the collecting is performed at least partially by a data communication module located within the container group, transmitting collected data, or data representative thereof, to an interface implemented on the host, and transmitting collected data, or data representative thereof, from the interface to a malicious detection module implemented on the host, for detecting malicious data.

In addition to the above features, the method according to this aspect of the presently disclosed subject matter can optionally comprise one or more of features (x) to (xviii) below, in any technically possible combination or permutation:
  x. the method includes, by at least one processing unit and memory: collecting data based on data communication of a container group including at least one container, the container group being implemented on a host, wherein the collecting is performed at least partially by a data communication module located within the container group, transmitting collected data, or data representative thereof, to an interface implemented on the host, and transmitting collected data, or data representative thereof, from the interface to a malicious detection module implemented on the host, for detecting malicious data;

xi. the method includes, for each of a plurality of container groups each including a plurality of containers: collecting data based on data communication of the container group, wherein the collecting is performed at least partially by a data communication module located within the container group, transmitting collected data, or data representative thereof, to an interface, and transmitting collected data, or data representative thereof, from the interface to a malicious detection module, for detecting malicious data;

xii. the system includes at least one of (a), (b) and (c): (a) a single interface is implemented on a host implementing the plurality of container groups; (b) for each container group of a plurality of container groups, the data communication module is a single module; and (c) a single malicious detection module is implemented on a host implementing the container group;

xiii. the method includes, for each host of a plurality of hosts: collecting data based on data communication of a container group including at least one container, wherein the collecting is performed at least partially by a data communication module located within the container group of the host, transmitting collected data, or data representative thereof, to an interface of the host, and transmitting collected data, or data representative thereof, from the interface to a malicious detection module of the host, for detecting malicious data;

xiv. the method includes, upon implementation of a new container, implementing a new container group including the new container and a data communication module configured to collect data based on data communication of the new container group;

xv. the method includes, upon implementation of a new container on a new host which differs from the host on which the container group is implemented, implementing on the new host: a new container group including the new container and a data communication module, an interface, a malicious detection module, wherein the data communication module is configured to: collect data based on data communication of the new container group, and transmit collected data to the interface of the new host, the interface being configured to transmit collected data, or data representative thereof, to the malicious detection module of the new host, for detecting malicious data;

xvi. the method includes performing, by the malicious detection module, a first analysis of whether collected data, or data representative thereof, is malicious; if the first analysis indicates that collected data, or data representative thereof, is malicious, transmitting at least part of the collected data, or data representative thereof to a third party for a second analysis;

xvii. if malicious data has been detected based on least on an output of the malicious detection module, the method includes at least one of: preventing at least one of transmission of the malicious data, reception of the malicious data, and connection to the malicious data, deleting malicious data, and putting malicious data in quarantine; and xviii. the method includes providing, upon detection of malicious data, at least one of: one or more sequences of source code of data identified as malicious; data representative of time of malicious data; data representative of a source of malicious data; data representative of a container group for which malicious data has been detected; data representative of a host for which malicious data has been detected.

According to another aspect of the presently disclosed subject matter there is provided a non-transitory storage device readable by a machine, tangibly embodying a program of instructions executable by the machine to perform operations including: collecting data based on data communication of a container group including at least one container, the container group being implemented on a host, wherein the collecting is performed at least partially by a data communication module located within the container group, transmitting collected data, or data representative thereof, to an interface implemented on the host, and transmitting collected data, or data representative thereof, from the interface to a malicious detection module implemented on the host, for detecting malicious data.

In some embodiments, the non-transitory storage device readable by a machine is tangibly embodying a program of instructions executable by the machine to perform operations (x) to (xviii), in any technically possible combination or permutation.

According to some embodiments, the proposed solution is able to detect malicious activity in a containerized environment in real time, or within a short reaction time.

According to some embodiments, the proposed solution is scalable, and can be used even in large containerized environments.

According to some embodiments, the proposed solution is operable even if data is encrypted in the communication between the containerized environment and third parties.

According to some embodiments, the proposed solution provides a smart and efficient architecture of malicious activity detection.

According to some embodiments, the proposed solution reduces computational resources required to detect malicious activity in a containerized environment.

According to some embodiments, the proposed solution eases update and management of a set of rules used to detect malicious activity in a containerized environment.

According to some embodiments, the proposed solution provides efficient and pinpointed detection of malicious activity in a containerized environment, which can include identification of malicious data, time of the malicious activity, source of the malicious activity, identification of source code sections which are malicious within the data, etc.

According to some embodiments, the proposed solution provides an efficient intrusion prevention system in a containerized environment.

BRIEF DESCRIPTION OF THE DRAWINGS

In order to understand the invention and to see how it can be carried out in practice, embodiments will be described, by way of non-limiting examples, with reference to the accompanying drawings, in which:

FIG. 2B depicts a non-limitative example of an output provided to user when malicious data has been detected;

FIG. 3 depicts an embodiment of a method of updating rules used by each of a plurality of malicious detection modules;

FIG. 4 depicts an embodiment of a method of creating a new container on an existing host;

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods have not been described in detail so as not to obscure the presently disclosed subject matter.

Unless specifically stated otherwise, as apparent from the following discussions, it is appreciated that throughout the specification discussions utilizing terms such as "collecting", "transmitting", "analyzing", "providing", "creating", "implementing" or the like, refer to the action(s) and/or process(es) of a processing unit that manipulates and/or transforms data into other data, said data represented as physical, such as electronic, quantities and/or said data representing the physical objects.

The term "processing unit" covers any computing unit or electronic unit with data processing circuitry that may perform tasks based on instructions stored in a memory, such as a computer, a server, a chip, a processor, a hardware processor, etc. It encompasses a single processor or multiple processors, which may be located in the same geographical zone or may, at least partially, be located in different zones and may be able to communicate together.

The term "memory" as used herein should be expansively construed to cover any volatile or non-volatile computer memory suitable to the presently disclosed subject matter.

Embodiments of the presently disclosed subject matter are not described with reference to any particular programming language. It will be appreciated that a variety of programming languages may be used to implement the teachings of the presently disclosed subject matter as described herein.

The invention contemplates a computer program being readable by a computer for executing one or more methods of the invention. The invention further contemplates a machine-readable memory tangibly embodying a program of instructions executable by the machine for executing one or more methods of the invention.

Figure 1:
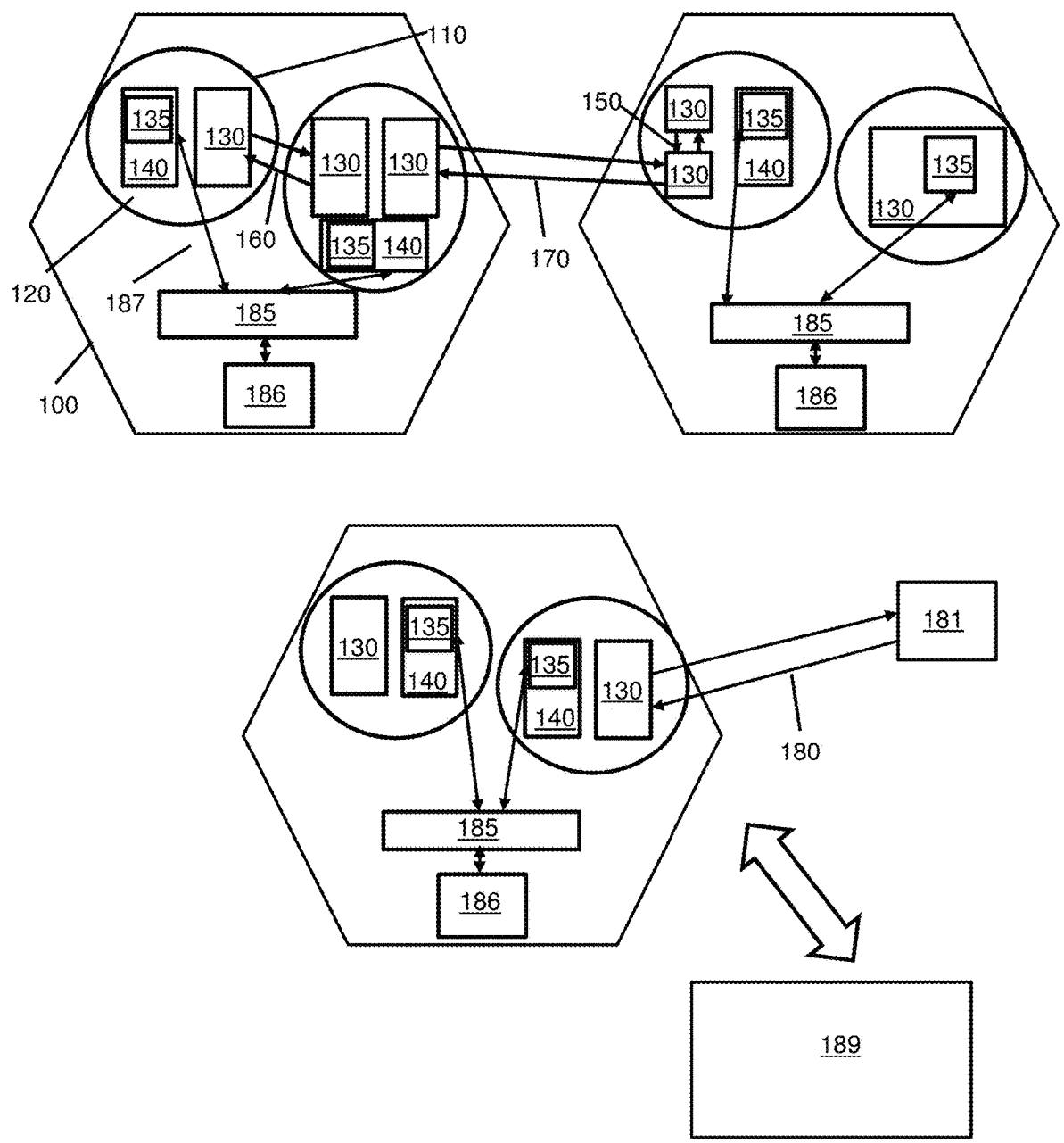
FIG. 1 illustrates an embodiment of an architecture of a containerized environment.

FIG. 1 illustrates an architecture of a containerized environment.

At least one host 100 is provided. In the non-limitative example of FIG. 1, three hosts are being used.

A host can include e.g. at least one server (which includes processing capabilities, and storage capabilities, such as a memory). In some embodiments, a host can include virtual processing resources, such as at least one virtual machine (VM).

A virtual machine (VM) is an emulation of a computer system. Virtual machines are based on computer architectures and provide functionality of a physical computer. Virtual machines generally include computer files that run on a physical computer (or server, or a plurality of computers/servers) and behave like a physical server or computer. Like physical computers, they run applications and an operating system.

In some embodiments, a host can include a combination of hardware (e.g. server) and software (virtual machine).

Each host 100 implements at least one container group 110. A container group 110 includes one or more containers 120. Containers are a form of operating system (OS) virtualization. In particular, containers are multiple isolated user space instances. OS-level virtualization refers to an operating system paradigm in which the kernel allows the existence of multiple isolated user space instances. Such instances are called e.g. containers (Solaris, Docker), or Zones (Solaris), etc.

A single container might be used to run various processes such as various workloads of the user, small micro-services, databases, software processes, etc.

The container group 110 includes at least one first container 130, which corresponds e.g. to workload of a user. In some embodiments, the container group 110 can include a plurality of containers 120 which implement e.g. a workload of a user.

In a non-limitative example, assume the user is a book seller. A first container group includes a container which runs a database storing a list of books. A second container groups includes a container which runs a reservation software. A third container group includes a container which runs a software for domestic purchase and another container which runs a software for international purchase.

The container group 110 includes a data communication module 135. The data communication module 135 is configured to listen to data communication of the container group 110 to which it belongs. In particular, the data communication module 135 is configured to collect at least one of:

data received by the container group 110,
data transmitted from the container group 110, and
data communicated within the container group 110.

In some embodiments, the data communication module 135 can collect all data which is involved in data communication of the container group 110.

Data communication can include e.g.:
- data 150 communicated (in reception and/or transmission) between different containers of the same container group;
- data 160 communicated (in reception and/or transmission) between containers of different container groups implemented on the same host; and
- data 170 communicated (in reception and/or transmission) between containers of container groups implemented on different hosts; and
- data 180 communicated between a container and an external module 181 (e.g. a server, a database, a network, etc. which are not necessarily part of a containerized environment).

A host is generally associated with a set of routing rules, which define how to route inbound and/or outbound data traffic. In a Linux-based host, the set of routing rules is called "IPTables Rules". It is therefore possible to manipulate the set of routing rules such that data communication of the container group 110 is redirected to the data communication module 135. The data communication module 135 forwards the data in parallel to an interface (interface 185, as explained hereinafter) and to the original destination of the data (the data communication module 135 acts therefore as a proxy).

Generally, data collected by the data communication module 135 corresponds to packets of data.

According to some embodiments, the data communication module 135 is implemented in a second container 140 of the container group 110, which is different from the first container 130. In other words, the data communication module 135 is an application or process which is implemented in the second container 140 and performs tasks as described above.

According to some embodiments, the data communication module 135 is implemented in the first container 130. In other words, the data communication module 135 is an additional application or process which is implemented in the first container 130 and performs tasks as described above, in addition to various applications or processes of the user which are implemented in the first container 130.

Both configurations are illustrated in FIG. 1.

According to some embodiments, each container group 110 (or at least each of a plurality of container groups 110 of a host, or of each of a plurality of hosts) includes a data communication module 135. According to some embodiments, for a given container group 110, there is only a single data communication module 135. In some embodiments, for a given container group 110, the second container 140 which implements the data communication module 135 is a single container.

In some embodiments, the containerized environment as depicted in FIG. 1 can be managed using Kubernetes (which is an open-source container-orchestration system). The containerized environment can be managed using other container-orchestration systems (e.g. Docker Swarm, Solaris, Amazon Web Services' Elastic Container Service (AWS ECS), and Apache Mesos).

The container-orchestration system generally includes one or more software instructions stored in a memory and is executable by one or more processing units.

In Kubernetes terminology, a container group 110 corresponds to a "pod", and a host 100 to a "node".

According to some embodiments, each host 100 implements an interface 185. According to some embodiments, each host 100 implements a single interface 185. The fact that each host implements a single interface 185 can be ensured e.g. using DaemonSet rules if Kubernetes is used.

All (or at least part of) data collected by the data communication module 135 of each container group 110 of a given host 100 is transmitted (see arrow 187) from the data communication module 135 to the interface 185 (see arrow 187).

In some embodiments, data collected by the data communication module 135 can be pre-processed and then sent to the interface 185. Therefore, interface 185 receives data representative of the collected data.

Examples of pre-process include (this list is not limitative) selecting up to X first bytes of each packet, attaching source information and/or destination information to the packet, performing higher level protocol (e.g. HTTP) parsing of the data and separating metadata from the payload.

According to some embodiments, interface 185 can be provided by an operating system of the host.

According to some embodiments, the interface 185 can include an inter-process communication socket which serves as a data communications endpoint for exchanging data. In a non-limitative example, interface 185 can be a Unix domain socket (which can be addressed e.g. as a file path). According to some embodiments, the interface 185 can include a TCP port (which can be addressed as an IP address with a port number).

According to some embodiments, each host 100 implements a malicious detection module 186. According to some embodiments, the malicious detection module 186 can be implemented as an agent on the host 100. According to some embodiments, the malicious detection module 186 can be implemented in a separate container (distinct from the containers 130 and 140) running on the container group 110. According to some embodiments, the malicious detection module 186 can be implemented in an existing container of a container group of the host (such as container 130 or 140 of container group 110). According to some embodiments, the malicious detection module 186 can be implemented in a container in a separate container group ("pod"), distinct from the container group 110.

According to some embodiments, each host 100 implements a single malicious detection module 186.

If the malicious detection module 186 is implemented in a separate container group ("pod"), in Kubernetes, DaemonSet rules can be used to ensure that the separate container group is unique per host.

At least some of the data received by the interface 185, or data representative thereof, is transmitted by the interface 185 to the malicious detection module 186 (if the interface 185 is implemented on a given host, then data is transmitted to the malicious detection module 186 of this given host).

According to some embodiments, the interface 185 can be accessed by an address (network address). The interface address can be used for defining:

a sender side, for sending data to the interface 185 (this corresponds e.g. to the data communication module(s) 135 which sends data to the interface 185); and a receiving side, for receiving data from the interface 185 (this corresponds e.g. to the malicious detection module 186 which receives data from the interface 185).

As a consequence, data received by the interface of a host can be forwarded to the malicious detection module 186 of the host.

The malicious detection module 186 includes instructions stored in a memory such that, when executed by a processing unit (e.g. the host), malicious data can be detected based on the collected data. Malicious data includes e.g. malware, malicious webpages, cyber threat, etc.

As shown in FIG. 1, the containerized environment (and in particular the malicious detection module 186) can communicate data with an external server 189 (also called back-end server). As explained hereinafter, the external server 189 can receive data from the malicious detection module 186, can provide a user interface, and in some cases can assist in detection of malicious data.

In some embodiments, data which is transmitted from the containerized environment to third parties (which are outside the containerized environment) is encrypted.

In some embodiments, a user interface can be implemented on the external server 189 (or in a computer in communication with the external server 189), which can output data representative of the malicious activity that has been detected in the containerized environment.

Figure 2:
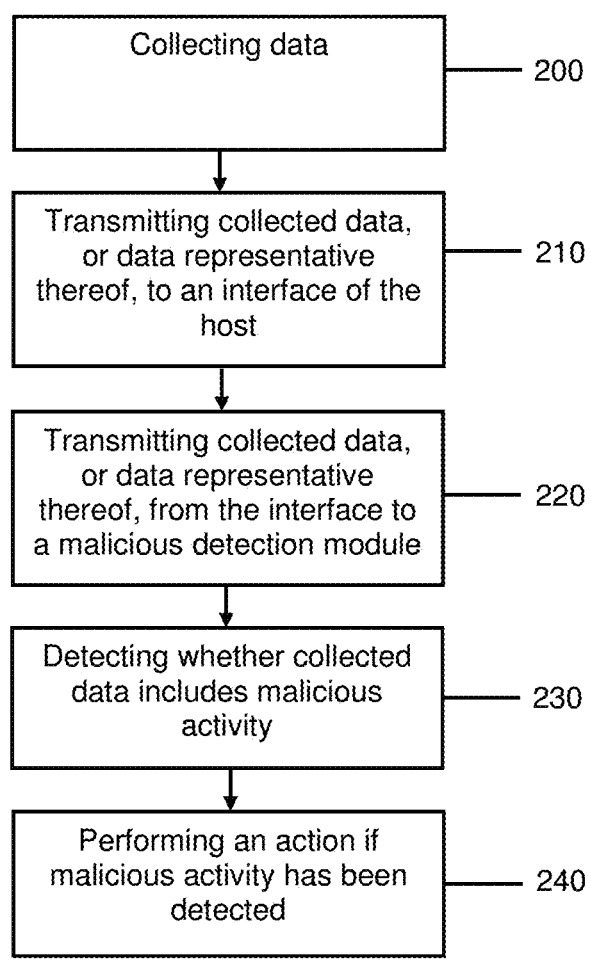
FIG. 2 depicts an embodiment of a method of detecting malicious data in a containerized environment, using the architecture of FIG. 1.

Attention is now drawn to FIG. 2, which depicts a method of detecting malicious data in a containerized environment, and which can rely on the architecture of FIG. 1.

A method can include collecting (200) data based on data communication of a container group (e.g. 110) including a plurality of containers.

As mentioned with reference to FIG. 1, the collecting can be performed at least partially by a specific data communication module (see reference 135) located within the container group. As mentioned with reference to FIG. 1, data communication of the container group can include various types of data, e.g. data 150, 160 and 170 as described above.

According to some embodiments, collection of data is performed in real time, or in quasi real time, or during a time that does not affect the user's experience of the containerized environment.

Since data is collected within the container group, in some embodiments, unencrypted data can be collected, thereby facilitating processing of this data. In some embodiments, encrypted data can be exchanged by the container group, but encryption data allowing decryption of the encrypted data is available within the host. This encryption data is available to the data communication module 135 which can therefore decrypt collected data.

The method can further include transmitting collected data (which is collected by e.g. data communication module 135) to an interface (see FIG. 1, interface 185). In some embodiments, the data communication module 135 can first pre-process the collected data before transmission to the interface 185. Transmission of the collected data can be performed as a host-internal communication.

According to some embodiments, if the data communication module 135 is implemented on a given host 100, and collects data transmission of a container group 110 also implemented on this given host 100, then the data communication module 135 transmits collected data, or data representative thereof, to the interface 185 also implemented on the given host 100.

The method can further include transmitting (220) collected data, or data representative thereof to a malicious detection module (see reference 186 in FIG. 1). According to some embodiments, interface 185 transmits collected data, or data representative thereof, to the malicious detection module 186 implemented on the same given host 100.

The method can further include detecting (230) whether collected data, or data representative thereof includes malicious data.

In some embodiments, the malicious detection module 186 can store a list of rules, or can communicate with a database storing the list of rules, which define which data should be considered as malicious. In some embodiments, the list can store at least one of:
  a sequence of bytes which are indicative of malicious activity;
  Internet addresses (e.g. IP addresses and/or domain names) indicative of malicious activity ("black list"); and
  sequences present in the source code of a file which are indicative of malicious activity.

The method can therefore include analyzing the content of the collected data using the rules stored in the list. If the analysis indicates a match, malicious activity is detected.

According to some embodiments, since the analysis is performed separately by each malicious detection module 186 on each host, the amount of data to be processed is reduced with respect to a purely centralized architecture, thereby improving performance.

Figure 2A:
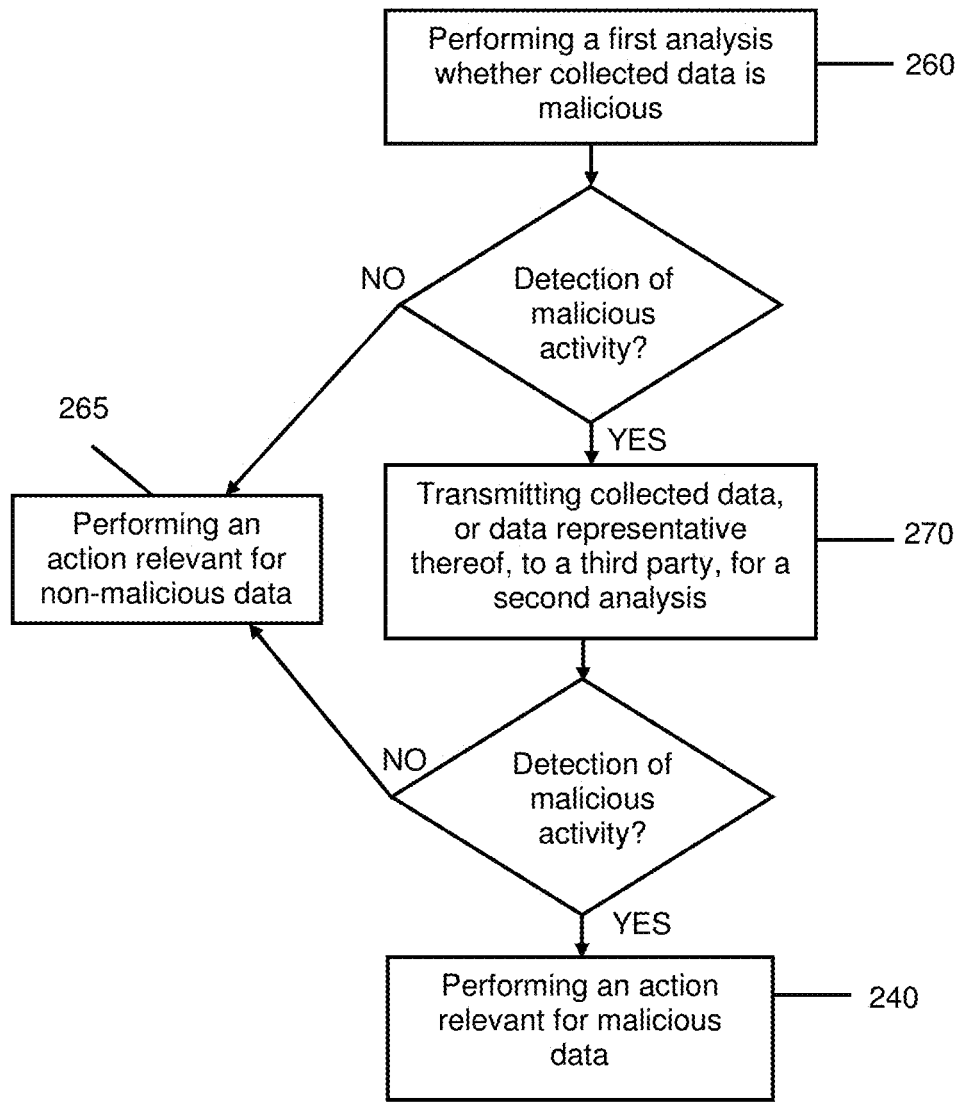
FIG. 2A depicts an embodiment of a method of detecting malicious data based on cooperation between a malicious detection module and a third party.

In some embodiments, and as depicted in FIG. 2A, detection of malicious activity can be performed by the malicious detection module 186 in cooperation with a third party, such as an external server (see reference 189 in FIG. 1).

According to some embodiments, the malicious detection module 186 performs a first analysis of whether collected data, or data representative thereof, is malicious (see operation 260 in FIG. 2A). For example, the first analysis can include analysing the collected data using a list including a first subset of rules. In some embodiments, this first subset of rules is of limited size, in order to ensure a low latency test (thereby improving computation time and performance). In some embodiments, the first analysis can include comparing content of the collected data with a list of malicious data using Bloom filters. This is however not limitative.

If the first analysis indicates that the collected data does not include malicious data, then an action (see 265) relevant for non-malicious data can be performed. The action can include providing a corresponding output (e.g. alert/display to a user and/or to a device that data is not malicious). The action can also include providing a command, such as authorizing connection to an address, authorizing further processing and/or communication of the collected data within the containerized environment, etc.

If the first analysis indicates that the collected data includes malicious data according to the first subset of rules, then the collected data can be (see operation 270) transmitted (e.g. from the malicious detection module 186) to a third party (e.g. external server 189). The third party can perform a second analysis. In particular, the second analysis can be performed using a list including a second subset of rules, wherein the second subset of rules is of larger size than the first subset of rules. The second subset of rules can include in some embodiments the first subset of rules and additional rules.

In other words, a more thorough analysis is performed by the third party, in order to confirm whether the collected data includes malicious data. Since the second analysis is performed by a third party, then more computation resources and time can be devoted to this task, without affecting computing resources of the containerized environment.

If the second analysis indicates that the collected data does not include malicious data, then an action (see 265) can be performed, which is relevant for non-malicious data, as explained above.

If the second analysis indicates that the collected data includes malicious data, then an action (see 240) which is relevant for malicious data can be performed. Examples of such an action are provided hereinafter.

Reverting to FIG. 2, when malicious data has been detected (using e.g. the method of FIG. 2, and/or the specific embodiment of FIG. 2A), an action can be performed (operation 240).

In some embodiments, the action 240 can include providing an output to a user and/or a device that collected data that is malicious.

In some embodiments, the action 240 can include outputting data representative of the malicious data that has been detected. The output can be provided e.g. to a user and/or a device. This output can include e.g. at least one of:
  one or more sequences of source code of data identified as malicious (the problematic sequence can be highlighted and output to a user—see reference 280 in FIG. 2B);
  semantic description of the type of malicious data (see reference 281 in FIG. 2B);
  identification data of the malicious data (e.g. number of the packet for which malicious data has been detected);

data representative of time of malicious activity (e.g. time at which the packet for which malicious data has been detected has been received and/or transmitted);

data representative of a source of malicious activity (e.g. identification of the source from which the malicious data has been transmitted, etc.);

data representative of a container group for which a malicious activity has been detected (this informs the user which container group has been attacked—in other words, identity of the workload can be provided to the user);

data representative of a host for which a malicious activity has been detected (this informs the user and/or the operator of the containerized environment regarding which host has been attacked).

In some embodiments, the output is triggered by the external server 189 and/or by the malicious detection module 186, which transmit the data to be output e.g. to an interface accessible by the user (e.g. the user receives the output on a display of his computer and/or smartphone).

In some embodiments, an action is performed which prevents intrusion of the malicious data in the containerized environment. The action can include at least one of:

deleting malicious data;
putting malicious data in quarantine;
preventing transmission of the malicious data;
preventing reception of the malicious data;
preventing connection to the malicious data (e.g. preventing connection to a web address associated with the malicious data, etc.).

In some embodiments, the action which prevents intrusion is triggered by the external server 189 and/or by the malicious detection module 186.

In some embodiments, the packet is collected by the data communication module 135 and is temporarily prevented from being further exchanged until analysis by the malicious detection module 186 has been performed.

In some embodiments, if only part of the packet has been detected as malicious (e.g. only some sequences of the source code of the file are malicious), then the action of preventing intrusion from the packet can be performed specifically only on the part of the packet which has been identified as malicious.

The method of FIG. 2 can be performed even if a plurality of hosts is used in the containerized environment. Then, in each given host, for each given container group, the data communication module 135 of the given container group collects data communication of the given container group to which it belongs (operation 200), transmits collected data or data representative thereof to the interface 185 implemented on the given host (operation 210), which in turn transmits collected data or data representative thereof to the malicious detection module 186 implemented on the given host (operation 220). Detection of malicious activity can be performed as explained above (see e.g. operations 230 and 240).

Attention is now drawn to FIG. 3. As explained above, according to some embodiments, the malicious detection module 186 of each host can analyse whether the collected data includes malicious data using a subset of rules.

In some embodiments, the subset of rules can be updated periodically. Assume that a containerized environment includes a plurality of hosts (see FIG. 1). Assume that the subset of rules is stored by each host (thereby allowing access by each malicious detection module 186), or is stored in a database accessible by each host.

A third party (e.g. external server 189) can periodically send (see operation 300) an updated version of the subset of rules, e.g. to each host, or to each malicious detection module 186 of each host, or to each database in communication with each host. Based on this updated version of the subset of rules, an update of the subset of rules used by each malicious detection module 186 of each host can be performed (operation 310).

Attention is now drawn to FIG. 4.

Assume (see operation 400) that it is instructed (using a tool such as Kubernetes) to create a new container (for example, because the user wants to devote the new container to a new type of workload).

Assume that the new container is to be implemented on a host which already implements an interface 185 and a malicious detection module 186.

The method can include implementing a new container group including the new container and a new data communication module (similar to data communication module 135) configured to collect data based on data communication of the new container group. The new data communication module can be implemented in the new container, or in a new second container within the new container group.

In some embodiments, upon instructions of creation of a new container, the method can include (operation 410) automatically creating the new container group with the new container and the new data communication module. Automatic creation of this new container group can be performed using a container-orchestration system, which is instructed to automatically build the desired architecture (upon instructions of creation of a new container).

Figure 4A:
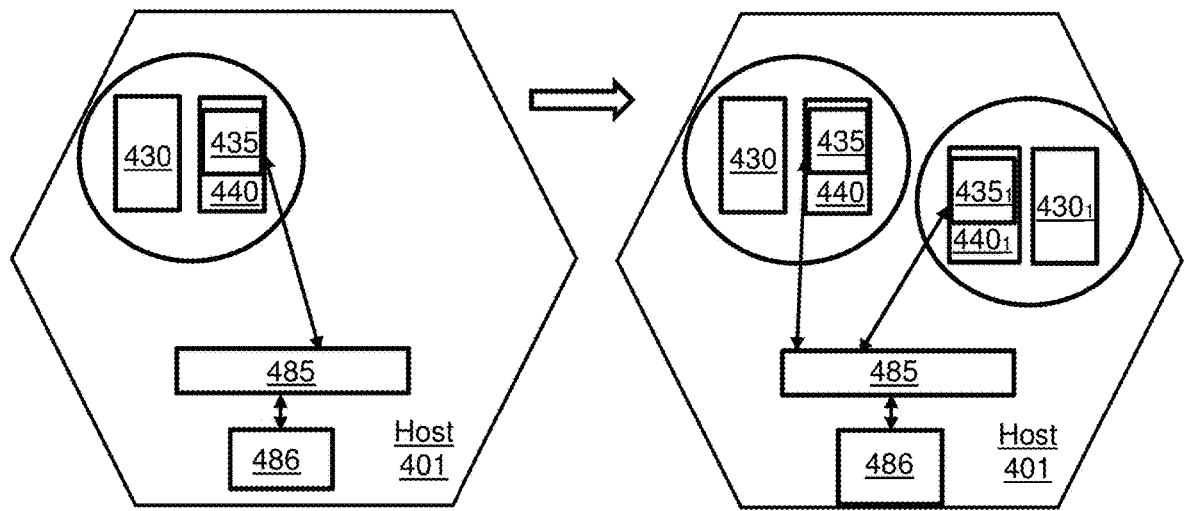
FIG. 4A illustrates a non-limitative example of the method of FIG. 4.

A non-limitative example of the method of FIG. 4 is illustrated in FIG. 4A. A host (reference 401) implements a container group including a first container 430 (similar to 130) and a second container 440 (similar to 140) including a data communication module 435 (similar to 135), an interface 485 (similar to 185) and a malicious detection module 486 (similar to 186).

Upon creation of a new container $430_1$, the method includes automatically creating a new container group including the new container $430_1$ and a new data communication module $435_1$ (similar to 135). In FIG. 4A, the new data communication module $435_1$ is implemented in a new second container $440_1$. As shown, the new communication module $435_1$ is configured to transmit collected data (which has been collected from data transmission of the new container group) to the interface 485 of the host 401, which in turns communicates with the malicious detection module 486.

Figure 4B:
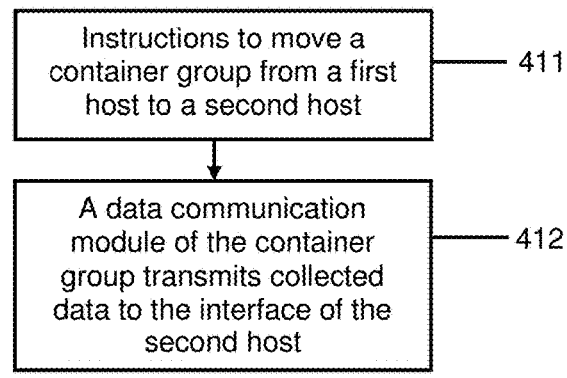
FIG. 4B depicts an embodiment of a method of moving a container from a first host to a second host.
Figure 4C:
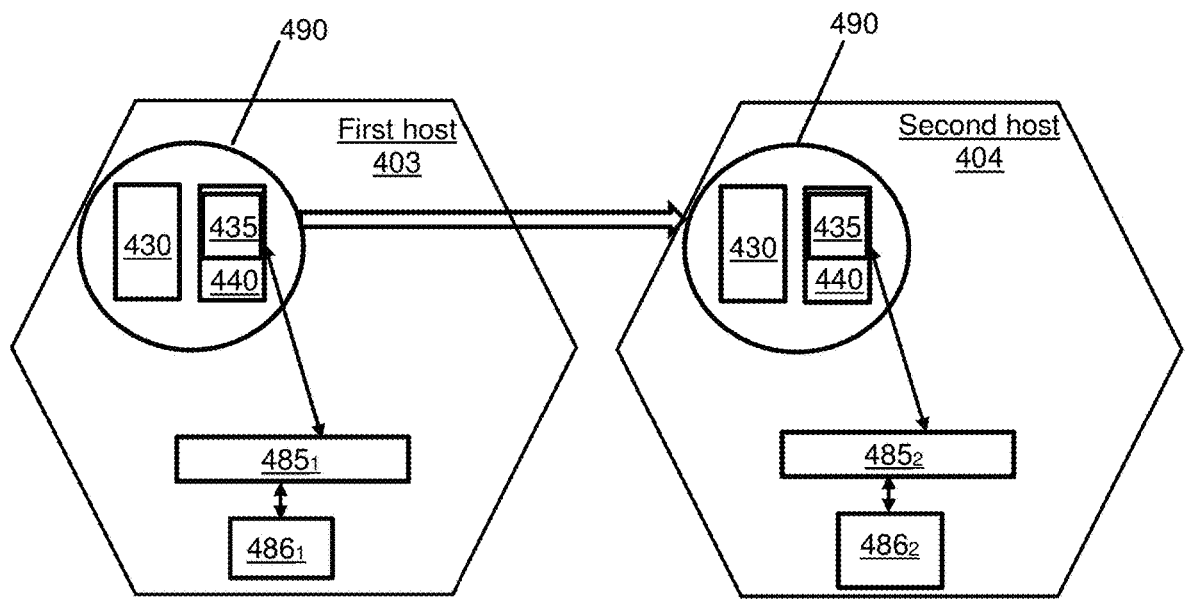
FIG. 4C illustrates a non-limitative example of the method of FIG. 4B.

Attention is now drawn to FIGS. 4B and 4C.

In the containerized environment, distribution of the container(s)/container group(s) over a plurality of hosts can evolve. This distribution can be managed e.g. by a container-orchestration system, such as Kubernete. In some cases, the user is not aware of the actual distribution of his workload (stored as containers) over the plurality of hosts.

For example, assume that during a period of time a container group 490 is implemented in a first host 403. Assume that the container-orchestration system instructs (see operation 411) to move the container group 490 from the first host to another existing host (second host 404). The container group 490 includes at least one first container 430 including the workload of the user, and a data communication module 435 (implemented in a second container 440—this is not limitative and data communication module 430 can be implemented in the first container 430) configured to collect data communication of the container group 490. Although the container group 490 is now implemented an another host 404 (this operation may be transparent to the user), the data communication module 435 automatically transmits data communication to the interface $485_2$ of the second host 404 on which it is implemented (and not to the interface $485_1$ of the first host 403 on which it was previously implemented). The data communication module 435 is configured to connect to the address of the interface. Since the only interface address which is available in the host is the address of the interface implemented on the host (host local address), the data communication module therefore connects to the interface of the host on which it is currently implemented.

Figure 4D:
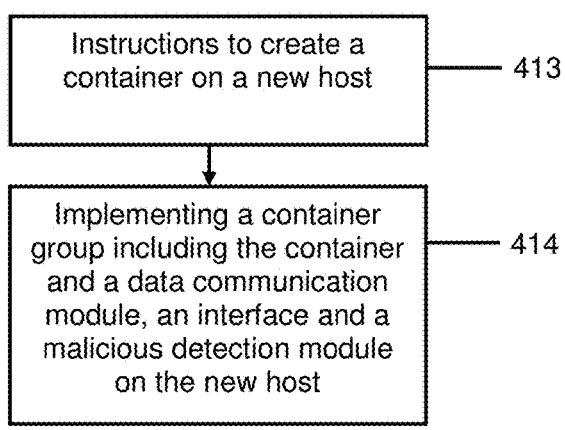
FIG. 4D depicts an embodiment of a method of creating a container on a new host.
Figure 4E:
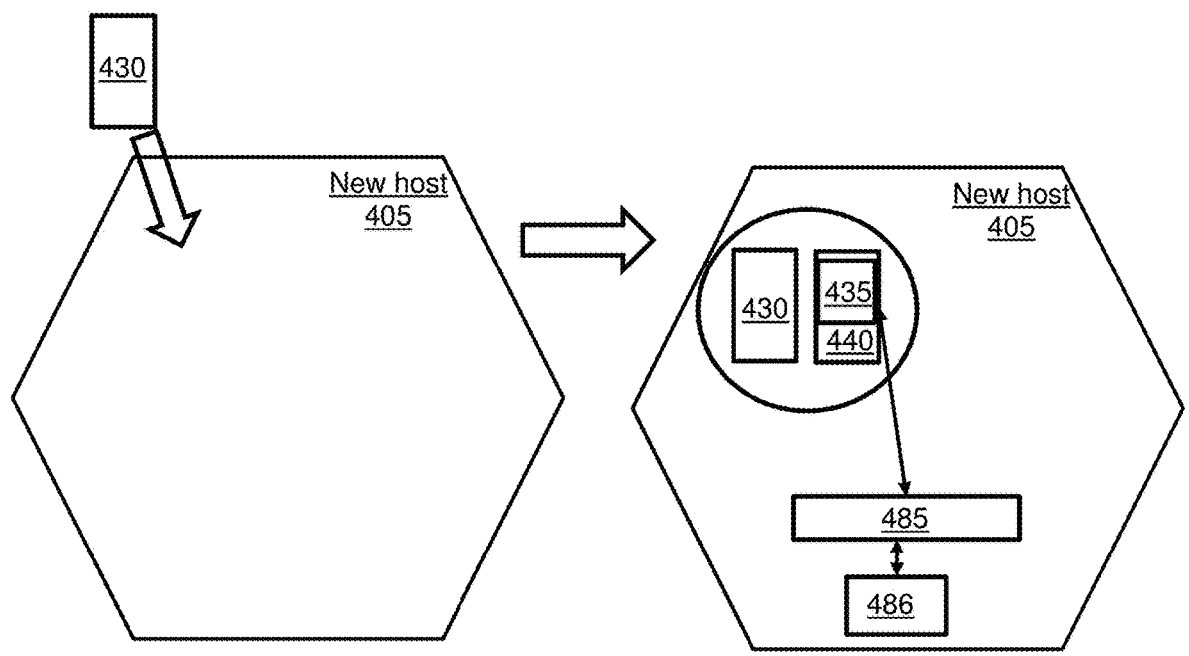
FIG. 4E illustrates a non-limitative example of the method of FIG. 4D.

Attention is now drawn to FIGS. 4D and 4E.

In some embodiments, a new host can be attributed to the user (e.g. by the container-orchestration system) for implementing his workload (this can be transparent to the user).

In some embodiments, a method can include, upon implementation (see operation 413) of a container 430 (the container 430 can be a new container, or an existing container which is transferred from another host) on a new host 405 which has not been yet configured as shown in FIG. 1 (e.g. because the new host was loaded and could not receive the workload of the user, or because the workload of the user was not sufficient to require use of the new host):

implementing, on the new host 405, a new container group including the container 430 and a data communication module 435 (configured to collect data transmission), which can be implemented in a second container 440, or in the container 430,
an interface 485, and
a malicious detection module 486.

According to some embodiments, configuration of the new host 405 (in particular implementation of the interface 485 and of the malicious detection module 486 on the new host), as explained above, is automatic, using e.g. adapted rules of the container-orchestration system, such as "DaemonSet" in Kubernetes.

It is to be noted that the various features described in the various embodiments may be combined according to all possible technical combinations.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the invention as hereinbefore described without departing from its scope, defined in and by the appended claims.

The invention claimed is:

1. A system including at least one host, wherein the host is configured to implement:
   at least one container group including:
      one or more first containers,
      a data communication module implemented in a second container,
      an interface provided by the operating system of the host and configured to exchange data with the at least one container group, and
      a malicious detection module,
   wherein the data communication module is configured to:
      collect data based on data communication of the one or more first containers of the container group including one or more of: data received by the container group and routed to one of the one or more first containers, data transmitted from the container group by one of the one or more first containers, or data transmitted between containers within the container group, and
      transmit the collected data, or data representative of the collected data, to the interface, the interface being configured to transmit the collected data, or the data representative of the collected data, to the malicious detection module, and detecting, by the malicious detection module, whether the collected data or data representative of the collected data includes malicious data.

2. The system of claim 1, wherein the host implements a plurality of container groups, wherein each container group includes:
   a first container,
   a data communication module,
   wherein the data communication module of each container group is configured to:
      collect data based on data communication of the container group,
      transmit collected data to the interface, the interface being configured to transmit collected data, or data representative thereof of the collected data, to the malicious detection module, for detecting malicious data.

3. The system of claim 1, including at least one of (i), (ii) and (iii):
   (i) the host implements a single interface common for a plurality of container groups;
   (ii) for each container group of plurality of container groups of the host, the data communication module is a single module; and
   (iii) the host implements a single malicious detection module.

4. The system of claim 1, including a plurality of hosts, wherein each host implements:
   at least one container group including:
      o a first container,
      a data communication module,
      an interface,
      a malicious detection module,
   wherein the data communication module is configured to:
      collect data based on data communication of the container group, and
      transmit collected data to the interface of the host, the interface being configured to transmit collected data, or data representative of the collected data, to the malicious detection module of the host, for detecting malicious data.

5. The system of claim 1, configured to, upon implementation of a new first container on a new host, implement, on the new host:
   a group of containers including the new first container and a data communication module,
   an interface,
   a malicious detection module,
   wherein the data communication module is configured to:
      collect data based on data communication of the container group, and
      transmit collected data to the interface of the host, the interface being configured to transmit collected data, or data representative of the collected data, to the malicious detection module of the host, for detecting malicious data.

6. The system of claim 1, wherein the malicious detection module of the host is configured to analyse collected data, or data representative of the collected data, according to a set of rules, wherein the set of rules is updatable based on instructions of an external server.

7. The system of claim 1, wherein:
the malicious detection module of the host is configured to perform a first analysis of whether collected data, or data representative of the collected data, is malicious;
in response to determining that the first analysis indicates that collected data, or data representative of the collected data, is malicious, at least part of the collected data, or data representative thereof is sent to a third party for a second analysis.

8. The system of claim 1, wherein:
if malicious data has been detected based on least on an output of the malicious detection module, the system is configured to trigger performing an action for the malicious data.

9. The system of claim 1, wherein the malicious detection module of the host is configured to provide, upon detection of malicious data, at least one of:
one or more sequences of source code of data identified as malicious;
data representative of time of malicious data;
data representative of a source of malicious data;
data representative of a container group for which malicious data has been detected; and
data representative of a host for which malicious data has been detected.

10. The system of claim 1, wherein:
the data communication module is implemented in a second container within the container group, distinct from the first container, or
the data communication module is implemented within the first container.

11. A method including, by at least one processing unit and memory:
collecting data based on data communication of a container group including at least one container, the container group being implemented on a host, the collected data including one or more of: data received by the container group and routed to one of the one or more first containers, data transmitted from the container group by one of the one or more first containers, or data transmitted between containers within the container group,
wherein the collecting is performed at least partially by a data communication module located within a second container of the container group,
transmitting collected data, or data representative thereof, to an interface implemented on the host and configured to exchange data with the at least one container group, and
transmitting collected data, or data representative of the collected data, from the interface to a malicious detection module implemented on the host, and
detecting, by the malicious detection module, whether the collected data or data representative of the collected data includes malicious data.

12. The method of claim 11, including, for each of a plurality of container groups each including a plurality of containers:
collecting data based on data communication of the container group, wherein the collecting is performed at least partially by a data communication module located within the container group,
transmitting collected data, or data representative of the collected data, to an interface, and
transmitting collected data, or data representative of the collected data, from the interface to a malicious detection module, for detecting malicious data.

13. The method of claim 11, including at least one of (i), (ii) and (iii):
(i) a single interface is implemented on a host implementing the plurality of container groups;
(ii) for each container group of a plurality of container groups, the data communication module is a single module; and
(iii) a single malicious detection module is implemented on a host implementing the container group.

14. The method of claim 11, including, for each host of a plurality of hosts:
collecting data based on data communication of a container group including at least one container, wherein the collecting is performed at least partially by a data communication module located within the container group of the host,
transmitting collected data, or data representative of the collected data, to an interface of the host, and
transmitting collected data, or data representative of the collected data, from the interface to a malicious detection module of the host, for detecting malicious data.

15. The method of claim 11, including, upon implementation of a new container, implementing a new container group including the new container and a data communication module configured to collect data based on data communication of the new container group.

16. The method of claim 11, including, upon implementation of a new container on a new host which differs from the host on which the container group is implemented, implementing on the new host:
a new container group including the new container and a data communication module,
an interface,
a malicious detection module,
wherein the data communication module is configured to:
collect data based on data communication of the new container group, and
transmit collected data to the interface of the new host, the interface being configured to transmit collected data, or data representative of the collected data, to the malicious detection module of the new host, for detecting malicious data.

17. The method of claim 11, including:
performing, by the malicious detection module, a first analysis of whether collected data, or data representative of the collected data, is malicious;
in response to determining that the first analysis indicates that collected data, or data representative thereof, is malicious, transmitting at least part of the collected data, or data representative thereof to a third party for a second analysis.

18. The method of claim 11, wherein:
if malicious data has been detected based on least on an output of the malicious detection module, the method includes at least one of:
preventing at least one of transmission of the malicious data, reception of the malicious data, and connection to the malicious data, deleting malicious data, and putting malicious data in quarantine.

19. The method of claim 11, including providing, upon detection of malicious data, at least one of:

one or more sequences of source code of data identified as malicious;

data representative of time of malicious data;

data representative of a source of malicious data;

data representative of a container group for which malicious data has been detected;

data representative of a host for which malicious data has been detected.

20. A non-transitory storage device readable by a machine, tangibly embodying a program of instructions executable by the machine to perform operations including:

collecting data based on data communication of a container group including at least one container, the container group being implemented on a host, the collected data including one or more of: data received by the container group and routed to one of the one or more first containers, data transmitted from the container group by one of the one or more first containers, or data transmitted between containers within the container group, wherein the collecting is performed at least partially by a data communication module located within a second container of the container group, transmitting collected data, or data representative thereof, to an interface implemented on the host and configured to exchange data with the at least one container group, and transmitting collected data, or data representative of the collected data, from the interface to a malicious detection module implemented on the host, and detecting, by the malicious detection module, whether the collected data or data representative of the collected data includes malicious data.

\* \* \* \* \*